June 16, 1942.  V. A. TURDIN  2,286,941
HEATER FOR MOTOR VEHICLES
Filed Nov. 13, 1941
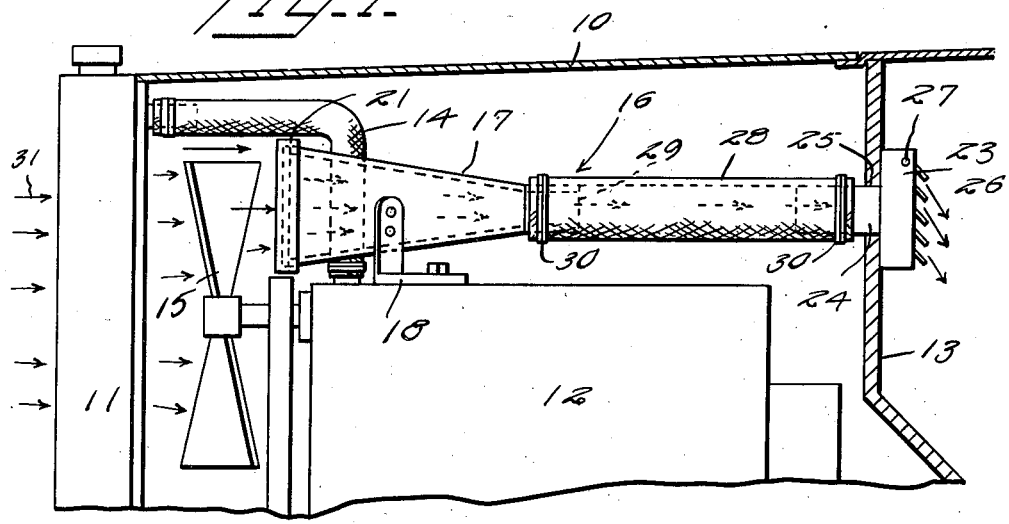
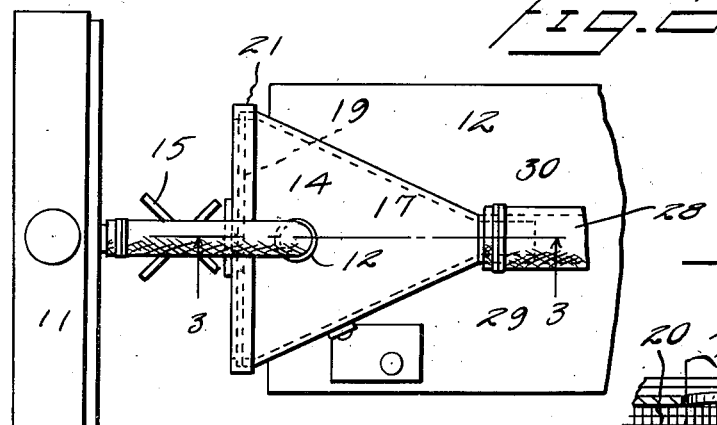
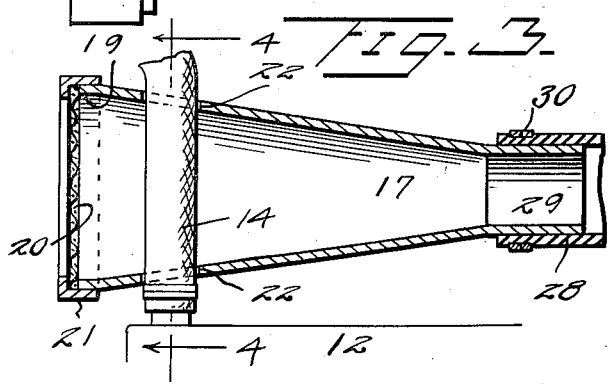
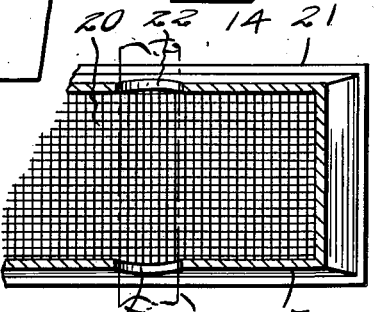
Inventor
V. A. Turdin
By L. F. Randolph
Attorney Patented June 16, 1942

2,286,941

UNITED STATES PATENT OFFICE 2,286,941

HEATER FOR MOTOR VEHICLES

Valentine A. Turdin, Wallingford, Conn.

Application November 13, 1941, Serial No. 418,996

1 Claim. (Cl. 237—12.3)

This invention relates to a novel heater for motor vehicles and more particularly to a heater of very simple construction, which can be manufactured and sold very economically, and which can be easily and quickly applied to all types of motor vehicles for heating the interiors thereof.

More particularly, it is an aim of the invention to provide a heater which will utilize air heated by passing through the vehicle radiator for heating the interior of the vehicle.

Still a further aim of the invention is to provide a heater having its intake end adapted to be mounted above the vehicle engine and behind the radiator and fan thereof, so that the air will be drawn through the radiator and expelled into the intake end of the heater by the fan.

Other objects and advantages of the invention will hereinafter become more fully apparent from the following description of the drawing, which illustrates a preferred embodiment thereof, and wherein:

Figure 1 is a vertical sectional view, partly a side elevation of the forward part of a motor vehicle and showing the heater, in side elevation, mounted therein, Figure 2 is a fragmentary top plan view of the forward portion of the heater, shown in an applied position, Figure 3 is an enlarged longitudinal vertical sectional view taken substantially along the plane of the line 3—3 of Figure 2, and Figure 4 is a cross-sectional view of the heater taken substantially along a plane as indicated by the line 4—4 of Figure 3.

Referring more particularly to the drawing, wherein like reference characters designate like or corresponding parts throughout the different views, for the purpose of illustration, 10 designates the hood of a motor vehicle, 11 the vehicle radiator, 12 the engine thereof, 13 the dash, 14 the hose or conduit which connects the top of the radiator to the top of the engine, and 15 the engine fan. These parts are all of conventional construction and are shown and described merely to better illustrate the heater, designated generally 16, and comprising the invention.

The heater 16 includes a funnel-shaped member 17 which is preferably supported above the engine 12 by means of a bracket 18 which is detachably fastened to the engine and to a side of the funnel-shaped member 17, to mount the funnel-shaped member so that its enlarged, open end 19 is disposed behind the radiator 11 and also behind the upper part of the fan 15. End 19 forms the inlet end of the heater 16 and is covered by means of a strip of mesh wire fabric 20 which is held in place thereon by means of a removable retaining member 21, as best seen in Figure 3. The funnel-shaped member 17 is preferably provided with aligned openings 22 at the top and bottom thereof through which the hose or conduit 14 extends.

A register 23 is mounted inside of the motor vehicle and is provided with a short inlet pipe 24 which extends through an opening 25 in the dash 13 for mounting the register 23 thereon. Register 23 is provided with shutters 26 which are adapted to be opened or closed by means of a knob 27, in a conventional manner, for a purpose that will hereinafter be described A conduit 28, such as a hose, has one end engaging over the rear, restricted end 29 of the funnel-shaped member 17 and has its opposite end engaging over the open, forward end of the pipe 24, for connecting the register 23 to the funnel-shaped member 17. The ends of the conduit 28 are detachably secured to the pipe 24 and the end 29 by means of retaining members 30.

The foregoing will be obvious that when the engine 12 is in operation and the vehicle is moving in a forward direction, the hot water from the engine 12 will pass upwardly and through the hose 14 into and downwardly through the radiator 11, and back to the engine 12. The air passing through the radiator 11 will cool the water therein and will be heated thereby and this air, indicated by the arrows 31 in Figure 1, will pass into the funnel-shaped member 17 through its end 19, and through the conduit 28 and the register 23 into the interior of the vehicle. This movement of the air will be produced by the forward motion of the vehicle and it can also be accomplished when the vehicle is not moving, by the fan 15 drawing the air inwardly through the radiator 11 and expelling some of this air into the end 19. Fan 15, when the vehicle is not in motion, will propel the air through the heater 16 and into the car or motor vehicle. The screen 20 will prevent dirt and foreign matter from passing through the heater. Shutters 26 can be opened and closed to admit or shut off, respectively, the flow of hot air into the vehicle or partially opened for restricting the flow of air through heater 16 by manually operating the knob 27. The air passing through heater 16 will also be heated by the portion of the hose 14 which is disposed in the funnel-shaped member 17.

If desired, funnel-shaped member 17 could be mounted on one side of the hose 14. Also, the shape of the inlet end 19 of the funnel-shaped member may obviously be varied if desired. Various other modifications and changes are likewise contemplated and may obviously be resorted to, provided they fall within the spirit and scope of the invention as hereinafter defined by the appended claim, as only a preferred embodiment of the invention has been disclosed.

I claim as my invention:

A heater for motor vehicles comprising an air inlet member, said member having an enlarged air inlet end or mouth adapted to be disposed behind and facing toward the radiator of a motor vehicle on which the heater is mounted, said air inlet member being substantially greater in width than in height at its mouth and being tapered toward its opposite, outlet end, a strip of mesh wire fabric disposed over the mouth of said member, a detachable retaining member for holding the strip in position, a bracket for supporting said member above and adjacent the engine of the vehicle and directly behind the engine fan, said member having openings in its top and bottom and adjacent its enlarged, inlet end, through which the hose, connecting the top of the radiator and engine extends, a register mounted in the dash of the vehicle and opening into the interior of the body thereof, and a conduit connected to the register at one end and connected to the restricted, outlet end of said member at its opposite end.

VALENTINE A. TURDIN.